3,839,500
READILY WATER-DISPERSIBLE SOLID PARTICULATE POLYACRYLAMIDE COMPOSITION AND PROCESS THEREFOR
Robin William Dexter, Ilkley, England, assignor to American Cyanamid Company, Stamford, Conn.
No Drawing. Filed Mar. 9, 1973, Ser. No. 339,695
Claims priority, application Great Britain, Mar. 14, 1972, 11,878/72
Int. Cl. C08f 29/50
U.S. Cl. 260—874
10 Claims

ABSTRACT OF THE DISCLOSURE

A readily water-dispersible solid particulate polyacrylamide composition is disclosed which consists of a high molecular weight acrylamide polymer containing at least a partial coating of a water-soluble polyalkylene glycol.

---

This invention relates to polyacrylamide and more particularly to polyacrylamide compositions which in solid particulate form are readily dispersible in water and to the process for obtaining same.

The terms "polyacrylamide" and "acrylamide polymer" as used herein include homopolymers of acrylamide and copolymers based on at least 5 percent acrylamide and the balance of a comonomer providing a water-soluble polymer, which polymers are well-known in the art.

It is common knowledge that the solid particulate acrylamide polymers currently available for use in flocculation processes, in spite of their water solubility, are difficult to disperse in water due to their tendency to form aggregates on addition to water. This problem becomes more acute as the molecular weight increases or as the proportion of anionic groups in the polymer increases. The aggregates become gelatinous as water penetrates them and are only dispersed with difficulty. Various procedures have been adopted heretofore to alleviate this problem; for example, the powdered polymer has been added slowly to a rapidly moving quantity of water by means of an eductor or, more simply, the powdered polymer has been added by hand to a rapidly rotating water vortex. Such procedures either use expensive equipment or are time consuming, and are not satisfactory. It has also been proposed to treat acrylamide polymers with various materials under various conditions with a view to improving the dispersibility of acrylamide polymers in water, but to date the results have not achieved commercial success.

In accordance with the present invention, there is provided a readily water-dispersible solid particulate polyacrylamide composition consisting essentially of (a) a solid particulate acrylamide polymer containing at least about 5 weight percent acrylamide and the balance of a comonomer which provides a water-soluble polymer and, at least a partial coating thereon, (b) from about 0.1 to 20 weight percent, based on the weight of said acrylamide polymer, of a water-soluble polyalkylene glycol having a molecular weight in the range of 200 to 10,000, said acrylamide polymer having a molecular weight of at least about 500,000 and a particle size sufficient to pass through about a 16-mesh screen.

There is also provided the process for preparing a readily water-dispersible polyacrylamide composition which comprises preparing a solid particulate acrylamide polymer containing at least about 5 weight percent acrylamide and the balance of a comonomer which provides a water-soluble polymer, said polymer having a molecular weight of at least about 500,000 and a particle size sufficient to pass through about a 16-mesh screen, uniformly distributing from about 0.1 to 20 weight percent, based on the weight of said acrylamide polymer, of a water-soluble polyalkylene glycol having a molecular weight of about 200 to 10,000 throughout said particles, and thereafter forming at least a partial coating of said polyalkylene glycol on said acrylamide polymer particles.

The present invention provides a product which is useful where difficulty would normally be experienced in dissolving and dispersing a conventional high molecular weight polyacrylamide flocculant in water. A solid particulate polyacrylamide composition of the present invention is easily dispersible in water and does not form gelatinous lumps even under conditions of zero stirring or agitation. The polyacrylamide composition is advantageously added to water in quantities to make a homogeneous solution containing for example 0.5–1.0% acrylamide polymer, with minimal mixing or stirring.

Production of homogeneous solutions of polymer has been a problem particularly where no sophisticated equipment is available for mixing. For example, in the manufacture of paper, where the presence of undissolved lumps of polymer gel in the polymer solution used can have a damaging effect on the properties of the paper being manufactured, by producing holes or flaws in the finished sheet, it is essential that solutions should be homogeneous and free from lumps of polymer gel.

The present invention is highly surprising and entirely unexpected in view of the vast number of agents that are ineffective in overcoming the water dispersibility problem associated with acrylamide polymers. The following classes of compounds, with representative examples thereof, indicate a partial listing of ineffective agents: non-ionic surfactants, such as ethoxylated lauric acid, ethyoxylated oleic acid, ethoxylated stearic acid, including varying ethoxylated chain lengths, sorbitan monoesters such as those of oleic, lauric and the like acids, various block polymers of mixtures of ethylene and propylene oxides; anionic surfactants, such as dodecyl sulfate, fatty acids such as stearic, lauric, and oleic acids and the corresponding sodium soaps thereof; hydrophobizing agents such as calcium and zinc stearates; polymeric materials, such as polyvinyl pyrrolidones of varying viscosities, polyvinyl alcohols of varying viscosities, starch ethers, and sodium carboxymethyl cellulose; non-ionic non-polymeric materials, such as urea, hexanol, ethylene glycol, and diethylene glycol; said admixtures employing such salts as critric acid salts, sodium sulfate, sodium carbonate, trisodium phosphate, and calcium silicate; and gassing salt mixtures, such as citric acid plus sodium carbonate, sulfamic acid plus sodium carbonate, citric acid plus sodium bicarbonate, and sulfamic acid plus sodium bicarbonate.

The acrylamide polymer, as previously indicated, may be a homopolymer of acrylamide (AM) or a coploymer containing at least 5 weight percent AM and the balance of a comonomer which provides a water-soluble polymer. Such polymers are well-known in the art as are their problems as to water dispersibility. The useful polymers are those that are water-soluble and have a molecular weight of at least about 500,000, preferably at least about 1,000,000. Useful ploymers may have molecular weights in excess of 5 million or 13 million or even more. Typical and preferred comonomers include sodium acrylate and dimethylaminoethyl methylacrylate. When the comonomer content exceeds 95 weight percent of the polymer, the ability of the polyalkylene glycol to provide the desired readily water-dispersible character to the polymer is adversely affected. The solid acrylamide polymer should have a particle size below about 16 mesh so as to provide the necessary state of subdivision necessary for rapid water-dispersibility. This mesh size is in accordance with the British Standards Institution, London BS-410.

The polyalkylene glycol useful is one having a molecular weight which provides water solubility at the level of use contemplated. These glycols are obtained by condensation of an alkylene oxide with water. The useful alkylene oxides and degree of condensation possible to provide the necessary molecular weights and water solubility are well-known and readily available commercially. Molecular weight values in the range of about 200 to 10,000 are useful where the water solubility requirements are met. The polyalklene glycol is advantageously a polyethylene glycol of a molecular weight in the range of about 1,000 to 6,000. The quantity of polyalkylene glycol required to coat at least partially the acrylamide polymer particles will generally lie in the range of 0.1 to 20, preferably 1 to 10, weight percent, based on the weight of the acrylamide polymer particles.

In one embodiment of the process of the present invention, the solid acrylamide polymer particles are agitated with a solution of the polyalkylene glycol, the solvent subsequently being evaporated to leave the acrylamide polymer particles coated with the polyalkylene glycol. The solvent used to dissolve the polyalkylene glycol can be any solvent which does not swell or dissolve the acrylamide polymer and which is readily evaporated from the treated product. For polyethylene glycols, it has been found to be convenient to use methanol. This embodiment of the invention can be carried out, for example, by:

(1) rolling the solid polymer particles in a drum or blender to which is added a quantity of a solution of the polyalkylene glycol sufficient to wet the surface of the polymer particles and then drying the polymer particles; or
(2) adding a solution of the polyalkylene glycol to solvent-wetted polymer particles in a thermal fluidized bed dryer, and drying the product by evaporating off the solvent.

In another embodiment of the process of the invention, the solid acrylamide polymer particles are mixed with solid, but granulated, polyalkylene glycol in a rotating drum or blender and heated to a temperature which is sufficient to melt the polyalkylene glycol. The blended product is then cooled while mixing before discharging.

The invention is more fully illustrated by the examples which follow wherein all parts and percentages are by weight unless otherwise specifically designated.

Example 1

A copolymer of 80 parts acrylamide and 20 parts sodium acrylate in solid particulate form was employed in a series of runs using a polyethylene glycol of molecular weight 1,000 as coating at various levels of usage. The molecular weight of the acrylamide polymer was about 4,500,000. Aliquots of 20 grams each were placed in a rotating flask together with a methanol solution of the polyethylene glycol so as to provide the desired level of coating. After through wetting of the acrylamide polymer particles with the methanol solution, the methanol was evaporated under vacuum using a heated water bath at 60° C. After drying for 5 minutes, the samples were cooled and were ready for test.

The "dispersibility" of the acrylamide polymer samples was qualitatively determined by adding 2.0 grams of the sample under test to 100 milliliters of water, using *no* agitation. After 15 seconds the mixture was stirred slowly at 30 r.p.m., and its appearance and the presences of lumps, etc. was then noted. In Table 1 below, the "dispersibility" of uncoated and coated acrylamide polymer particles prepared as above, using 2½%, 5%, and 10% of the polyethylene glycol are compared. The particle size analyses in each sample are also shown. A further consequence of the process of the invention is that the proportion of fine material in the acrylamide polymer sample is reduced by agglomeration to form larger particles, and this has been found to aid dispersibility of the acrylamide polymer.

TABLE I

| Run [1] | Coating,[2] percent | Size analysis (grams) | | | Dispersibility |
|---|---|---|---|---|---|
| | | −16, +22 | −22, +44 | −44 | |
| Comparative | 0 | 11.0 | 6.5 | 2.6 | Almost completely in one lump. |
| 1 | 2.5 | 12 | 6.6 | 0.9 | Very few lumps, almost all dispersed. |
| 2 | 5.0 | Not determined | | | No lumps, all dispersed. |
| 3 | 10.0 | 17.9 | 3.0 | 0.2 | Do. |

[1] Polymer=80% acrylamide/20% sodium acrylate.
[2] By weight based on polymer weight.

Example 2

Following the procedure of Example 1, additional solid particulate polyacrylamide compositions were prepared using a number of different particulate polyacrylamides. In each instance the molecular weight and particles size was as in Example 1. In Table II are shown dispersibility characteristics of coated and uncoated polymers as well as identity of the polymer compositions.

The results in Table II show that dispersibility is fair when the percentage of acrylamide in the polymer is below 50% and is good with acrylamide polymers containing at least 50% acrylamide and either a cationic or anionic comonomer.

TABLE II

| Polymer composition | Coating (percent)[1] | Dispersibility |
|---|---|---|
| Acrylamide (homopolymer) 100% | 0 | Poor. |
| | 5 | Good. |
| Acrylamide/sodium acrylate 90/10 | 0 | Poor. |
| | 5 | Good. |
| Acrylamide/sodium acrylate 80/20 | 0 | Very poor. |
| | 5 | Good. |
| Acrylamide/sodium acrylate 60/40 | 0 | Very poor. |
| | 5 | Good. |
| Acrylamide/sodium acrylate 40/60 (comparative). | 0 | Very poor. |
| | 5 | Fair. |
| Sodium acrylate homopolymer (comparative). | 0 | Very poor. |
| | 5 | Fair. |
| Acrylamide/dimethylaminoethyl methacrylate 90/10. | 0 | Poor. |
| | 5 | Good. |
| Acrylamide/dimethylaminoethyl methacrylate 80/20. | 0 | Poor. |
| | 5 | Good. |

[1] Polyethylene glycol, M.W.=1000.

Example 3

The acrylamide polymer consisting of 40% sodium acrylate and 60% acrylamide, as employed in Example 2, is regularly used as a flocculant for settling out suspended solids in waste waters of paper mills. The formation of the solution of flocculant used in such operations normally requires careful supervision and slow addition of the acrylamide polymer particles, otherwise lumping occurs. A solution of the acrylamide polymer coated as in Example 2 was made up by adding all of the polyacrylamide composition to the water with only mild agitation. No lumps formed and no adverse effect in flocculating ability arose as a result of the presence of the polyethylene glycol.

Example 4

A solution of the acrylamide polymer containing 20% dimethylaminoethyl acrylate and 80% acrylamide as employed in Example 2 is used in paper manufacture to aid in the retention of paper-pulp fibers within the sheet as it is formed. Difficulties in the making-up of solutions of the acrylamide polymer similar to those described above are usually encountered. A solution of the coated polymer of Example 2 was made up by adding all of the coated polymer to the water in one addition with slight agitation. No lumps were formed. A solution of the same polymer coated with 2% of the same polyethylene glycol was made up in the same way with similar results. The presence of the polyethylene glycol had no adverse effects on performance of the polymers as flocculants.

The embodiments of the invention in which an exclusive property or privilege is claimed are defined as follows:

1. A readily water-dispersible solid particulate polyacrylamide composition consisting essentially of (a) a solid particulate water-soluble acrylamide polymer containing at least about 5 weight percent acrylamide and the balance of a comonomer which provides a water-soluble polymer and, as at least a partial coating thereon, (b) from about 0.1 to 20 weight percent, based on the weight of said acrylamide polymer, of a water-soluble polyalkylene glycol having a molecular weight in the range of 200 to 10,000, said acrylamide polymer having a molecular weight of at least 500,000 and a particle size sufficient to pass through about a 16-mesh screen.

2. The composition of Claim 1 wherein said polyalkylene glycol is polyethylene glycol.

3. The composition of Claim 2 wherein said polyethylene glycol is present in the amount of 2 to 1 weight percent.

4. The composition of Claim 1 wherein said acrylamide polymer is a homopolymer.

5. The composition of Claim 1 wherein said acrylamide polymer is a copolymer of acrylamide and sodium acrylate.

6. The composition of Claim 1 wherein said acrylamide polymer is a copolymer of acrylamide and dimethylaminoethyl methacrylate.

7. A process for preparing a readily water-dispersible polyacrylamide composition which comprises preparing a solid particulate water-soluble acrylamide polymer containing at least about 5 weight percent acrylamide and the balance of a comonomer which provides a water-soluble polymer, said polymer having a molecular weight of at least about 500,000 and a particle size sufficient to pass through about a 16-mesh screen, uniformly distributing from about 0.1 to 20 weight percent, based on the weight of said acrylamide polymer, of a water-soluble polyalkylene glycol having a molecular weight of about 200 to 10,000 throughout said particles and thereafter forming at least a partial coating of said polyalkylene glycol on said acrylamide polymer particles.

8. The process of Claim 7 wherein the polyalkylene glycol is distributed as a solution in methanol.

9. The process of Claim 7 wherein said acrylamide polymer is a copolymer of acrylamide and sodium acrylate.

10. The process of Claim 7 wherein said acrylamide polymer is a copolymer of acrylamide and dimethylaminoethyl methacrylate.

References Cited

UNITED STATES PATENTS 3,590,101   6/1971   McTaggart et al. __ 260—876 R

MURRAY TILLMAN, Primary Examiner

C. J. SECCURO, Assistant Examiner

U.S. Cl. X.R.

260—29.6 WB, 901